UNITED STATES PATENT OFFICE.

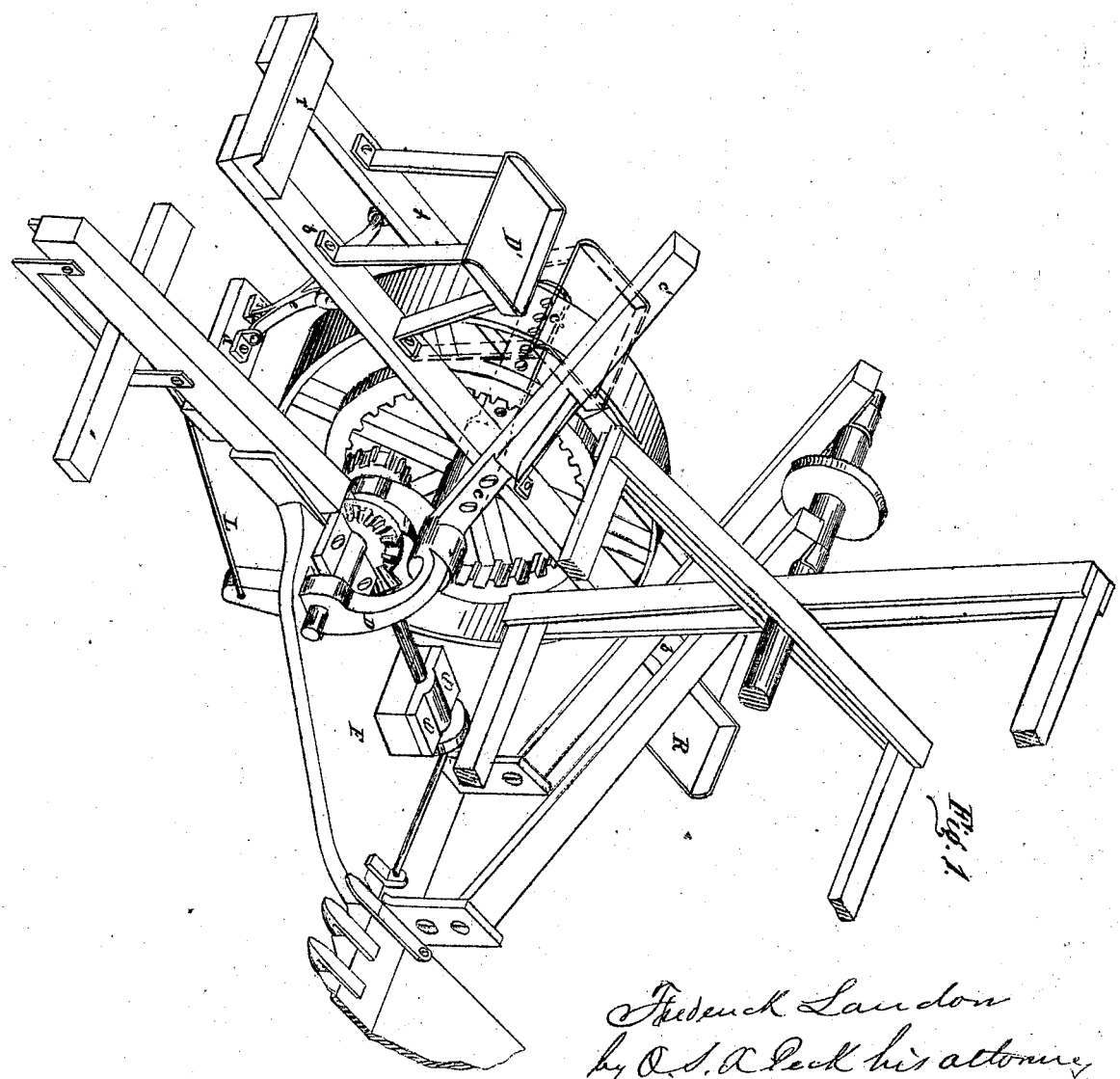

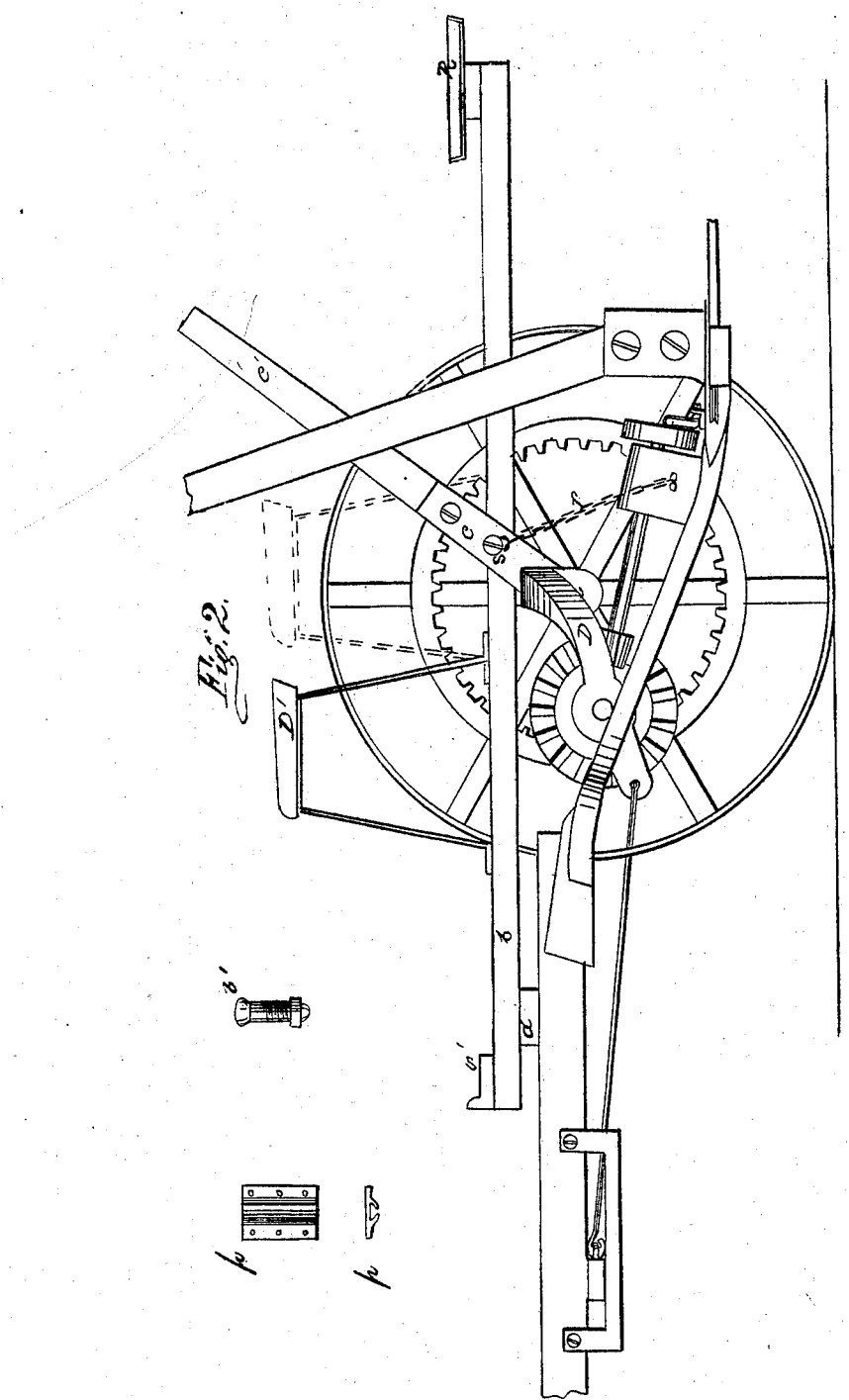

FREDERICK LANDON, OF BROCKPORT, NEW YORK, ASSIGNOR TO BYRON E. HUNTLEY, JOHN M. BOWMAN, CHARLES SILLIMAN, AND LAFAYETTE SILLIMAN.

IMPROVEMENT IN HARVESTERS.

Specification forming part of Letters Patent No. 32,446, dated May 28, 1861.

*To all whom it may concern:*

Be it known that I, FREDERICK LANDON, of Brockport, in Monroe county, and State of New York, have invented certain new and useful Improvements in Harvesting-Machines; and I do hereby declare that the following is a full, true, and exact description of the same, reference being had to the accompanying drawings, making a part of this specification, in which—

Figure 1 is a view in perspective of a harvesting-machine containing my improvements, arranged for harvesting grass. Fig. 2 represents a side elevation of such a machine when adjusted for harvesting small grain.

The inventions described herein are improvements upon the invention described in a patent granted on the 13th day of November, A. D. 1860, on my specification to Byron E. Huntley, John M. Bowman, Charles Silliman, and Lafayette Silliman, as my assignees, and as the general structure of the machine containing these improvements is similar to the machine on which the aforesaid patent was granted, I omit a particular description of it, and refer to said patent therefor.

My invention consists, first, in constructing and combining a hand-lever, with the traction-lever described in said patent, and in carrying it up convenient to a driver's seat, so that a driver thereon may conveniently raise the cutting apparatus on any sudden emergency to any suitable height, in the presence of obstructions in its path; and, secondly, in constructing and combining a seat-frame with the traction-lever, before mentioned, and with the hand-lever, in such a manner that it shall correspond in its backward and forward movement with the movement of the rearward end of the traction-lever, and at the same time preserve a nearly-horizontal position.

That others skilled in the art may make and use my invention, I proceed to state the manner of its construction and the principle of its operation.

The functions of the traction-lever D having been stated in the patent issued on my aforesaid invention, further statement thereof in detail is not deemed necessary here. It may be observed, however, that one of its effects was stated to be to cause an automatic adjustment of the cutting apparatus of the machine to undulations in the ground in its path when used in harvesting grass. Provision was not made, however, for raising the cutting apparatus suddenly in the presence of obstructions in its path while the machine is used in harvesting grass. I have therefore provided such means as one of the improvements herein described.

I construct the traction-lever D described in the before-mentioned patent as therein stated, and I cast upon its upper rearward end, or I bolt to such end, a flat metallic arm, and carry said arm upwardly from the point of its connection with the traction-lever to near a distance coincident with the periphery of the drive-wheel, and in direction toward a driver's seat; and it is represented in the drawings by the letter $c$. I fasten a handle to its upper end, and carry it convenient to the seat of a driver, and by use of it the driver may suddenly raise the cutting apparatus to any suitable height in the presence of obstructions in its path. The handle attached to the arm $c$ is marked $c'$ in the drawings.

My seat-frame is of rectangular shape, and may be constructed of any strong pieces of timber or wood of near two inches in thickness, and be firmly secured together at the corners, and it is represented in the drawings by the letters $b\ b\ b$. I take a short flat bar of metal, similar in shape to arm $c$, and having made a hole through the flat side thereof, I slip it onto the exterior end of the axle of the drive-wheel, where it is firmly held, and I carry it up on a line parallel with the arm $c$ to a similar height. It is marked $c^2$ in the drawings. I provide a series of holes in the arms $c$ and $c^2$, and I suspend the rearward end of the seat-frame on metallic pins through any of those holes. I secure a cross-piece, $d$, to the tongue of the machine, as seen in the drawings, and I hinge the seat-frame, near its forward end, by a double hinge, $e$, to this cross-piece, which constitutes the arrangement of the seat-frame when used in harvesting hay. When I arrange the machine for harvesting grain, I carry back the handle of the hand-lever $c'$ to such a distance as to raise the cutting apparatus to a proper height for harvesting grain, and I hold it, and I prevent its further forward motion by securing the chain $r$ to the arm $c$ by the screw-bolt $s$; but I do not by this means prevent the traction effect of the traction-lever. The adjustments of the machine for harvesting grain shortens the line of the motion of the traction-lever, but it does not impair the effect of its action within such limited line of motion.

The effect of carrying the hand-lever $c'$ back, as above stated, upon the double hinge $e$ is to render the hinge nearly useless, and it may, therefore, be substituted by a recessed metallic plate, $p$, secured to the bottom of the rest $r'$, for the driver's feet, and by slipping the head of a bolt, $b'$, into the recess therein, which may be secured to the piece $d$, before mentioned, or by a short chain, so that as the traction-lever D moves backward and forward in the progress of the machine, the seat-frame will participate in its motion and still preserve a nearly-horizontal position.

The position on the seat-frame for the driver D′ may be as indicated in black lines in Figs. 1 and 2, and as the position for the raker is indicated on the rearward end of the seat-frame, and is indicated by the character R, it will be apparent that the weight of the raker will counterpoise the weight of the driver, which constitutes the adjustment of the machine for harvesting grain.

The position for the driver's seat, when harvesting hay, is indicated in red lines in the drawings, and it is sought so to locate it as to deprive it of the character of a lever-seat by so placing it as to let it occupy a position of equilibrium on the seat-frame.

Having thus set forth my invention, what I claim therein as new, and desire to secure by Letters Patent, is—

1. The combination of a hand-lever with the traction-lever D, for the purpose set forth, and substantially as described.

2. The combination of a seat-frame with the traction-lever D of a harvesting-machine, for the purposes set forth, and substantially as described.

3. The combination of the hand-lever $c'$ with the traction-lever D and the seat-frame $b\ b\ b$, for the purposes set forth, and substantially as described.

In testimony of which invention I hereunto set my hand.

FREDK. LANDON.

Witnesses:
   RUSH REED,
   D. HOLMES.